United States Patent
Doyle

(10) Patent No.: US 7,905,497 B2
(45) Date of Patent: Mar. 15, 2011

(54) RING SEAL AND RETAINER ASSEMBLY

(76) Inventor: Michael Doyle, Villa Park, CA (US)

( * ) Notice: Subject to any disclaimer, the term of this patent is extended or adjusted under 35 U.S.C. 154(b) by 353 days.

(21) Appl. No.: 12/069,744

(22) Filed: Feb. 11, 2008

(65) Prior Publication Data

US 2008/0191426 A1 Aug. 14, 2008

Related U.S. Application Data

(60) Provisional application No. 60/902,036, filed on Feb. 12, 2007.

(51) Int. Cl.
*F16J 15/08* (2006.01)
(52) U.S. Cl. ......... 277/608; 277/616; 277/637; 277/640
(58) Field of Classification Search .................. 277/603, 277/606, 607, 608, 609, 616, 620, 624, 637, 277/639, 640, 644
See application file for complete search history.

(56) References Cited

U.S. PATENT DOCUMENTS

| | | | | |
|---|---|---|---|---|
| 3,869,132 A | * | 3/1975 | Taylor et al. | 277/608 |
| 4,552,389 A | | 11/1985 | Babuder et al. | 285/379 |
| 4,650,227 A | | 3/1987 | Babuder et al. | 285/379 |
| 4,838,583 A | | 6/1989 | Babuder et al. | 285/354 |
| 5,340,170 A | | 8/1994 | Shinohara et al. | 285/379 |
| 5,354,072 A | | 10/1994 | Nicholson | 277/206 |
| 5,423,580 A | | 6/1995 | Mohlenkamp et al. | 285/379 |
| 5,758,910 A | * | 6/1998 | Barber et al. | 285/330 |
| 5,979,910 A | * | 11/1999 | Shinohara et al. | 277/616 |
| 6,170,890 B1 | * | 1/2001 | Ohmi et al. | 285/379 |
| 6,708,985 B1 | * | 3/2004 | Doyle | 277/616 |
| 7,140,647 B2 | * | 11/2006 | Ohmi et al. | 285/328 |

* cited by examiner

*Primary Examiner* — Shane Bomar
*Assistant Examiner* — Robert E Fuller
(74) *Attorney, Agent, or Firm* — David G. Duckworth; Russo & Duckworth, LLP

(57) ABSTRACT

The ring seal and retainer assembly includes an annularly shaped ring seal defining a radial inner surface, a radial outer surface, first and second axial end surfaces and a central bore for fluid or gas passage. A retainer is provided for affixing and positioning a ring seal in a sealing assembly. The retainer includes a circular sidewall sized and positioned to engage and cover the ring seal's radial outer surface. The retainer includes an arcuate flange which extends at one of the retainer's axial extremities to form a concave interior and a convex exterior. Preferably, the arcuate flange extends outwardly to increase the retainer's radius and the arcuate flange is sized to compressibly engage the interior sidewall of the component block's counterbore.

13 Claims, 10 Drawing Sheets

RING SEAL AND RETAINER ASSEMBLY

RELATED APPLICATIONS

This application is a continuation-in-part of U.S. Provisional Application Ser. No. 60/902,036, filed Feb. 12, 2007.

BACKGROUND OF THE INVENTION

The present invention relates to seals, often referred to as gaskets, for making a fluid or gas tight joint between opposed mating surfaces. More particularly, the present invention relates to retainers for positioning seals between opposed mating surfaces.

Ring seals are typically annularly shaped, defining an axially aligned hole for gas or fluid passage, two axially opposed end surfaces, a radial inner surface and a radial outer surface. The most simplistic ring seal includes planar end surfaces and smooth circular radial inner and outer surfaces which define the inner diameter (ID) and outer diameter (OD) of the ring seal.

An additional commonly used ring seal is circular and has a radial cross-section of a "C" shape. These "C seals" are constructed with the open side of the C construction facing the center of the ring such as described in U.S. Pat. No. 5,354,072, or with the open side of the C facing away from the center of the ring. As two mating surfaces are brought together with the C seal in the middle, the C seal is compressed with the open side of the C cross-section closing during compression. The ductile properties of the seal permit plastic deformation to occur without damaging the mating surfaces.

Additional seals which have been available include "V seals" which are also circular, but instead of having a "C" cross-section, the V seal has a "V" cross-section with the low point of the V constructed to point either inwardly or outwardly towards the center of the seal. Moreover, seals in the art include "Z seals" and simple "O rings".

With reference to FIGS. 1 and 4, many typical ring seals 1 include an annular body configuration and a circumferential groove 15 formed on the ring seal's outer radial surface. In addition, many ring seals include a recessed sealing surface 19 formed into each of the axial end surfaces. In operation, the opposed mating surfaces of the sealing assembly engage and form an air or fluid tight seal at the ring seal's recessed sealing surface. However, the opposed mating surfaces typically do not engage or form a seal at the ring seal's recessed regions. The sealing surface is recessed to protect the surface from becoming damaged during handling. For example, ring seals having planar surfaces often become scratched when placed on flat surfaces due to dirt or metal shavings scratching the ring seal's sealing surface. To overcome this drawback, the ring seal's sealing surface is recessed so as to not come into contact with debris prior to assembly within a sealing assembly. Unfortunately, ring seals having recessed sealing surfaces are expensive to manufacture and the recessed sealing surface is very difficult to polish.

Retainers are often used to hold and position a ring seal in place between two opposed mating surfaces. Retainers have been constructed in various forms. For example, U.S. Pat. No. 5,340,170 describes a retainer for positioning a gasket in a pipe joint. The retainer includes a cylindrical sidewall, an inwardly extending edge for engaging a ring seal and a plurality of claws for grabbing a pipe.

Meanwhile, U.S. Pat. No. 5,423,580 discloses a retainer having a semicircular sidewall for grasping the outer edge of a ring seal and extremity of a pipe. Moreover, additional retainer arrangements are disclosed in U.S. Pat. Nos. 4,552,389; 4,650,227; and 4,838,583.

An additional prior art ring seal and retainer assembly is shown in FIGS. 1-4. The ring seal includes a typical annular body configuration and circumferential groove formed on the ring seal's outer radial surface. In addition, the ring seal includes a recessed sealing surface 19 formed on each of the axial end surfaces. The retainer is obtained from a single loop of a coil spring, which is then formed into a circular band. The coil retainer is positioned within the ring seal's circumferential groove so that the outer edge of the coil projects outwardly beyond the edge of the ring seal. Meanwhile, the opposed mating surfaces include a fitting including a recess sized and positioned for receipt of the coil retainer's edge. Once press fit into place, the retainer is restrained from inadvertent movement.

Unfortunately, the above-described retainers all suffer from significant disadvantages. For example, the coil retainer and sharp edges of the ring seal are prone to scratching, or otherwise harming, the opposed mating surfaces. This can impede the ring seal's ability to provide a gas or fluid tight seal. Moreover, ring seals having a recessed sealing surface are expensive to manufacture. Meanwhile, the retainer described in U.S. Pat. No. 5,340,170 is capable of use only with a ring seal of an unusual construction. Furthermore, the retainer disclosed in U.S. Pat. No. 5,423,580 also does not protect the edge of a ring seal from unwantingly scratching one of the opposed mating surfaces.

An additional disadvantage of present ring seal and retainer assemblies is that the ring seal must be positioned and aligned very precisely with the gaseous passageway. Any misalignment can cause the ring seal to fail and excessively leak. Unfortunately, present ring seal and retainer assemblies do not provide a structure for automatically positioning and aligning the ring seal between opposed mating surfaces.

Thus, it would be desirable to provide an improved ring seal and retainer assembly which is inexpensive to manufacture and easy to use.

In addition, it would be desirable to provide an improved ring seal and retainer assembly which does not require recessed sealing surfaces which are expensive to manufacture and difficult to polish.

Moreover, it would be desirable to provide an improved ring seal and retainer assembly which provides protection against damage to a ring seal's sealing surfaces, while not being susceptible to scratching or otherwise marring the opposed mating surfaces prior to forming an air-tight or gas-tight seal.

It would also be desirable to provide a ring seal and retainer that provide for precise positioning and alignment of the ring seal prior to forming a gaseous tight joint between opposed mating surfaces.

SUMMARY OF THE INVENTION

The present invention addresses the aforementioned disadvantages by providing an improved ring seal and retainer assembly. To this end, the ring seal is annularly shaped having an axially aligned hole for gas or liquid passage. The ring seal further includes a radial inner surface, a radial outer surface and first and second axial end surfaces. Meanwhile, the retainer is circular in shape, and includes a sidewall which is sized and positioned to cover and engage the ring seal's radial outer surface. The circular sidewall protects the ring seal's radial outer surface from becoming damaged prior to assembly within a sealing assembly, and protects the opposed mating surfaces from being damaged by preventing the ring seal's outer edge from scratching the opposed mating surfaces during assembly. Moreover, preferably, the retainer's circular sidewall projects axially beyond the ring seal's axial end surfaces. The protruding extremities of the circular sidewall protect the ring seal's axial end surfaces during storage and transportation thereby eliminating the need for the ring seal having a recessed sealing surface.

In a preferred embodiment, the retainer extends axially beyond one or both of the ring seal's axial end surfaces to provide an arcuate flange. Preferably, the arcuate flange is constructed to form a concave interior and a convex exterior. The arcuate flange extends radially outward from the retainer's circular sidewall so as to provide the ring seal and retainer assembly with a substantially increased radius. Preferably, the arcuate flange is substantially adjacent to one of said ring seal's axial end surfaces. The increased radius of the arcuate flange is preferably sized to reside in a press-fit arrangement within a counterbore formed within one of the opposed mating surfaces of a component block. The retainer may include one arcuate flange adjacent to one axial end of the ring seal, or the retainer may include two arcuate flanges with one arcuate flange adjacent to each of the axial ends of the ring seal.

The annular retainer includes means for affixing the retainer's circular sidewall adjacent to the ring seal's radial outer surface. In a first embodiment, to maintain the annular retainer affixed to the ring seal, the ring seal includes a circumferential groove which circumnavigates the ring seal's radial outer surface. The circumferential groove may be constructed in similar form to grooves constructed in the prior art; such as the groove including planar walls forming a squared indent. Alternatively, the circumferential groove may be formed in alternative configurations, such as V-shaped or rounded recesses as can be determined by those skilled in the art. Meanwhile, the annular retainer includes a circumferential ridge sized and positioned to project inwardly from the retainer's circular sidewall into the ring seal's circumferential groove. The circumferential ridge projects into the ring seal's groove to inhibit the annular retainer from inadvertently being dislodged or disengaged from the ring seal.

In an alternative embodiment, the annular retainer does not include a single ridge which circumnavigates the annular retainer's interior surface, but instead includes a plurality of ridges which only partially circumnavigate the annular retainer's inner surface. Again, however, the ridges are sized and positioned to project into the ring seal's circumferential groove. In a preferred embodiment, the annular retainer is provided with three ridges positioned at 120° increments around the annular retainer.

It is thus an object of the present invention to provide a ring seal and retainer assembly which is very reputable, of high quality, inexpensive to manufacture and reliable for providing a seal between two planar surfaces.

It is still an additional object of the invention to provide an improved ring seal and retainer assembly which does not require recessed sealing surfaces which are expensive to manufacture and difficult to polish.

Moreover, it is an object of the present invention to provide an improved ring seal and retainer assembly which provides protection against damage to a ring seal's sealing surfaces, while not being susceptible to scratching or otherwise marring the opposed mating surfaces prior to forming an air-tight or gas-tight seal.

It is an additional object of the invention to provide a ring seal and retainer assembly which is not prone to being scratched or damaged, and which is not prone to scratching or damaging the mating surfaces between which a seal is sought.

DETAILED DESCRIPTION OF THE DRAWINGS

Figure 9:
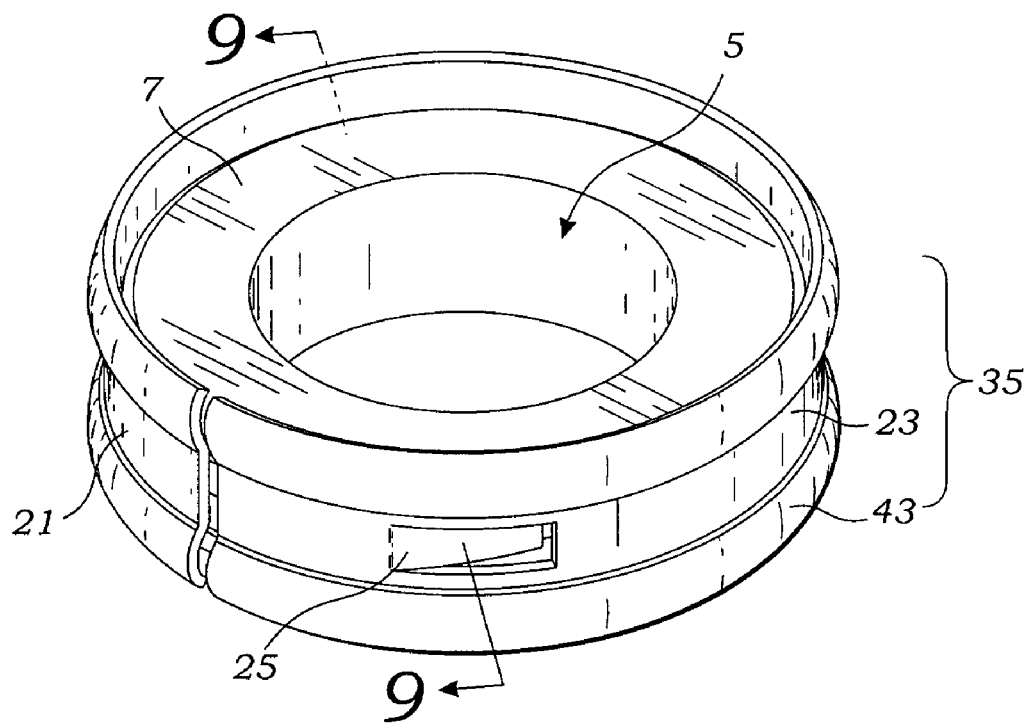
FIG. 9 is a perspective view illustrating a ring seal and retainer assembly of the present invention wherein the retainer includes two arcuate flanges.
Figure 10:
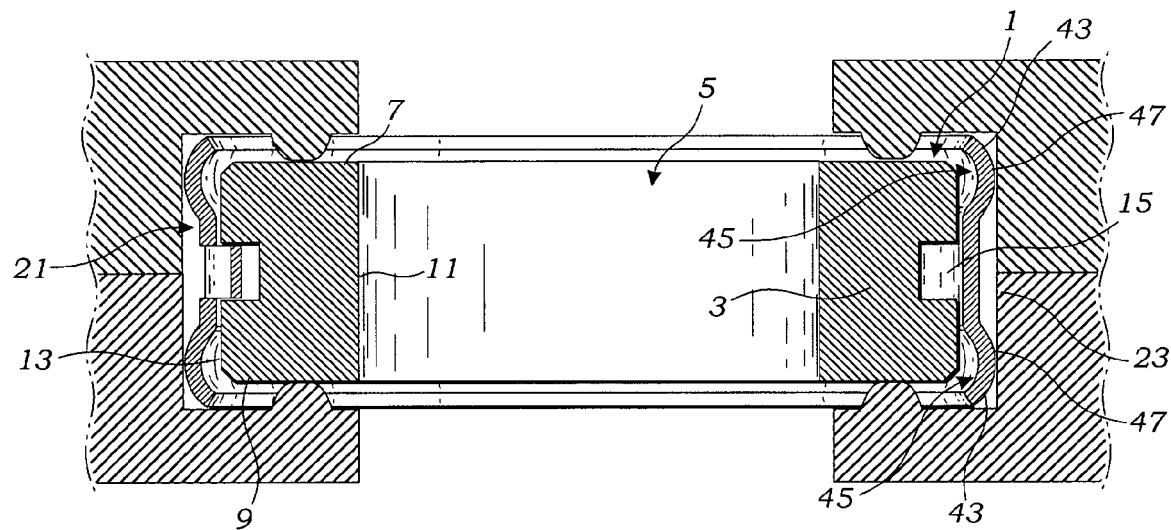
Figure 11:
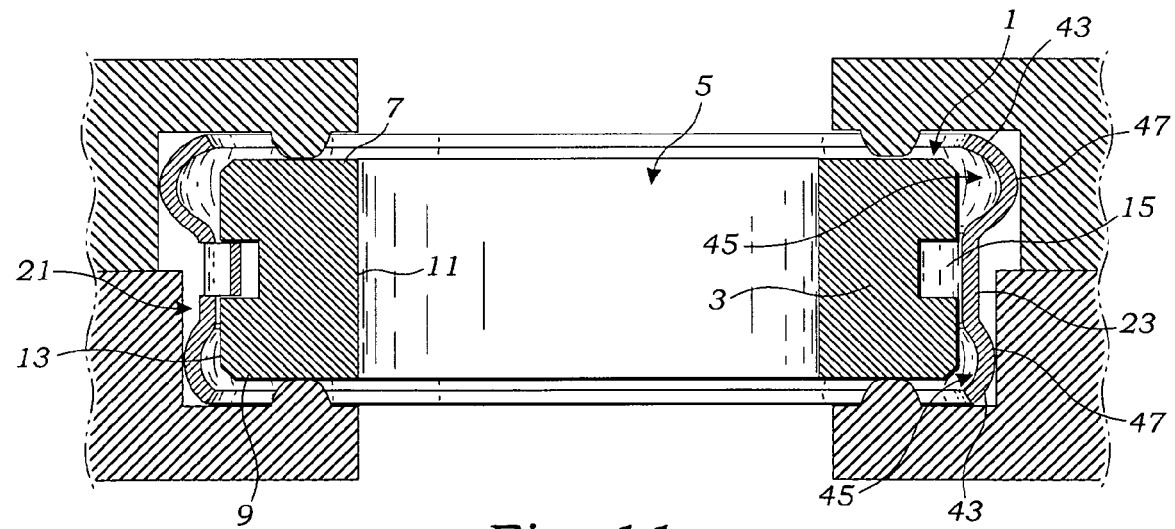
Figure 1:
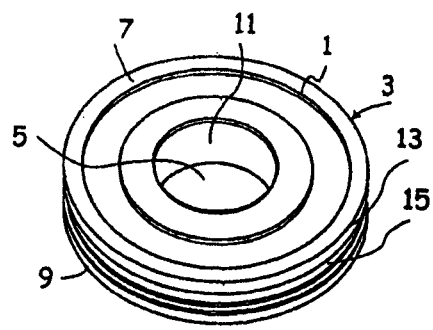
Figure 2:
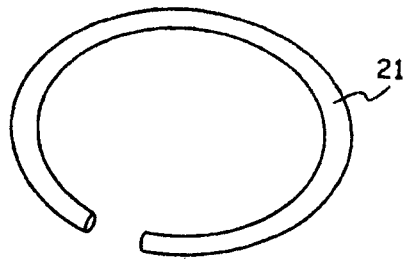
Figure 3:
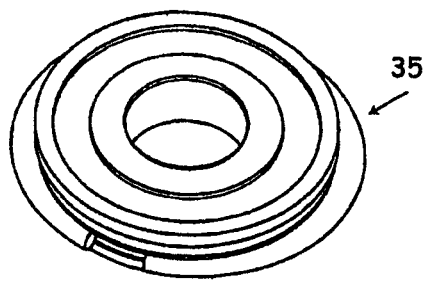
Figure 4:
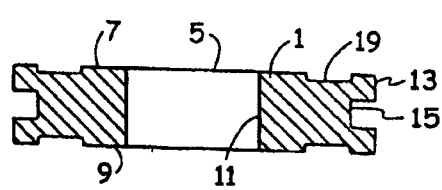
Figure 5:
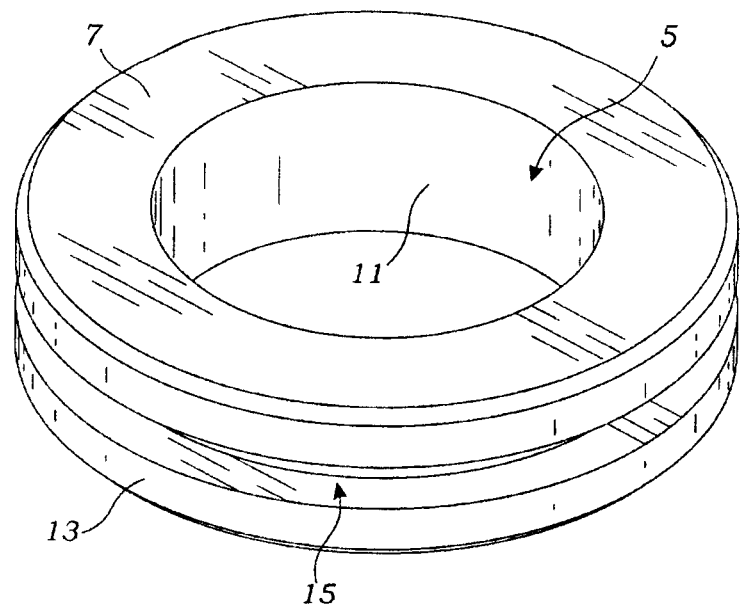
Figure 6:
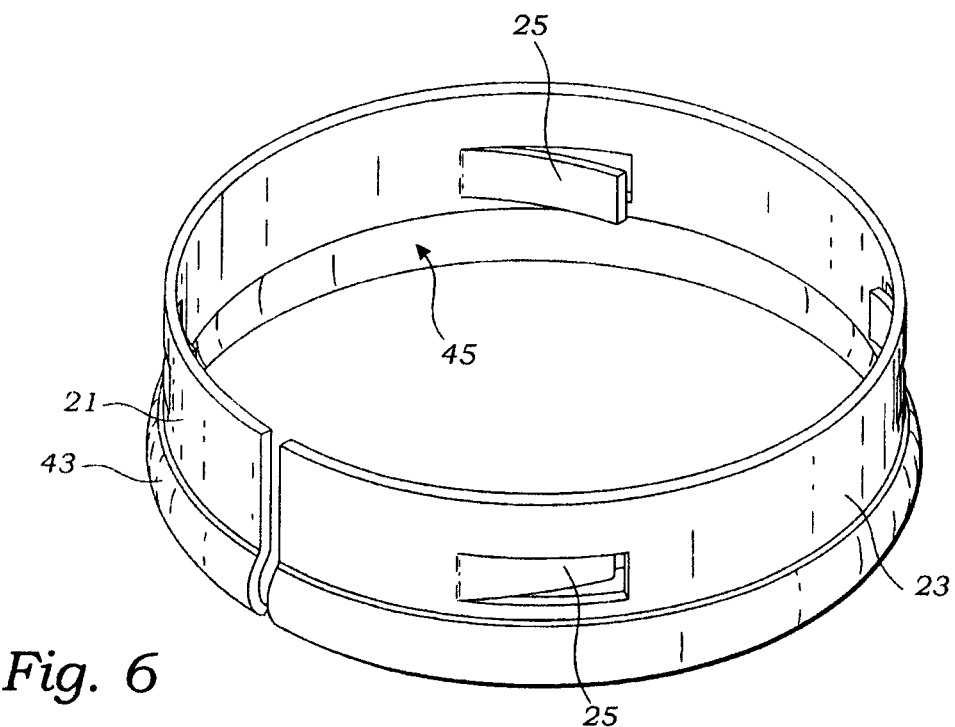
Figure 7:
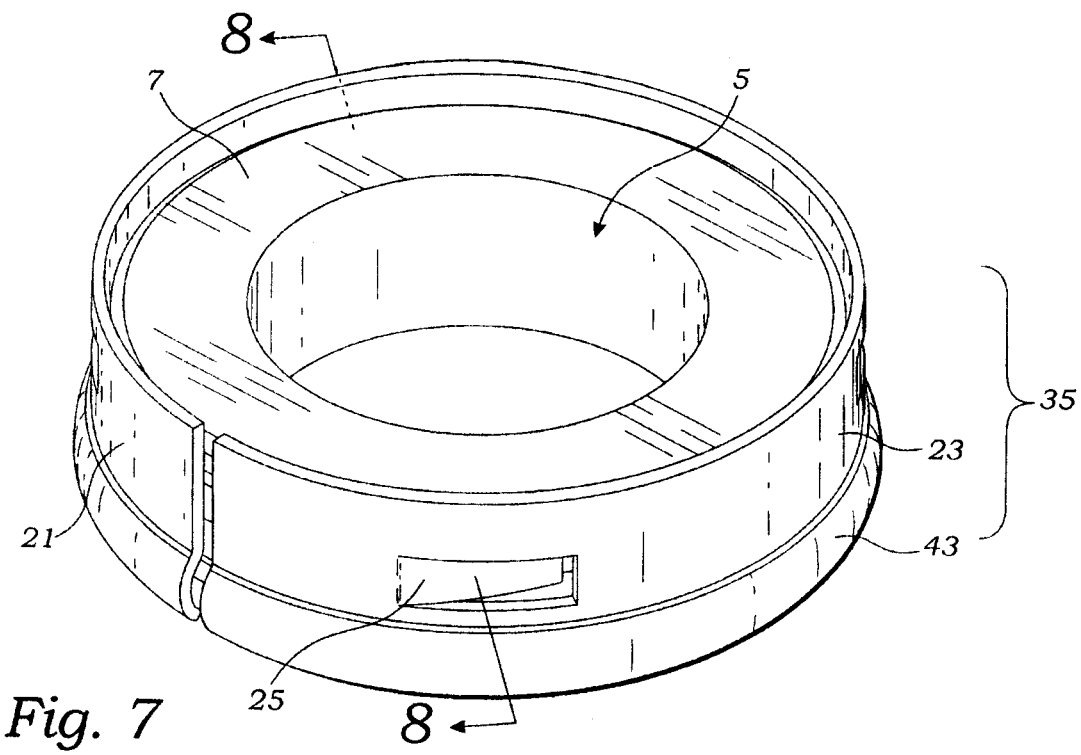
Figure 8:
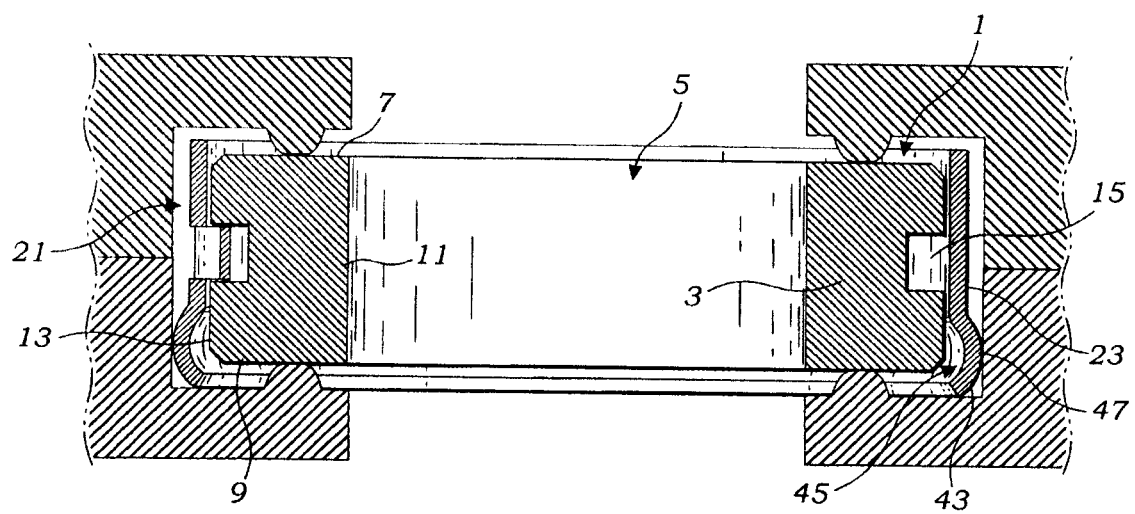
Figure 9:
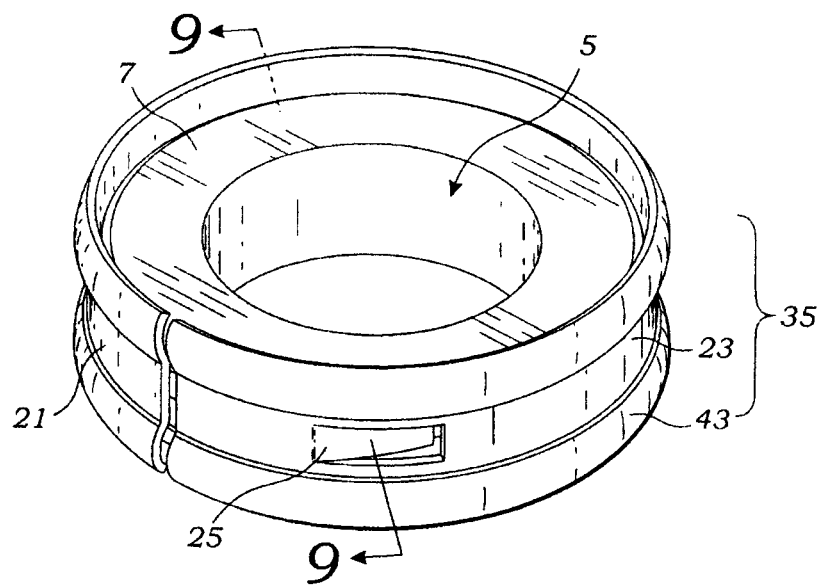
Figure 10:
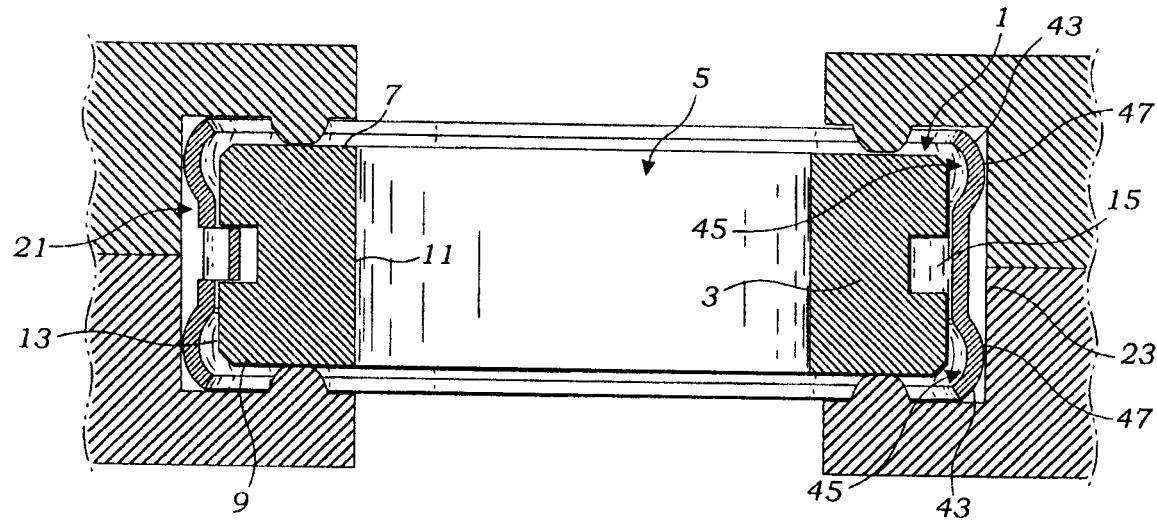
Figure 11:
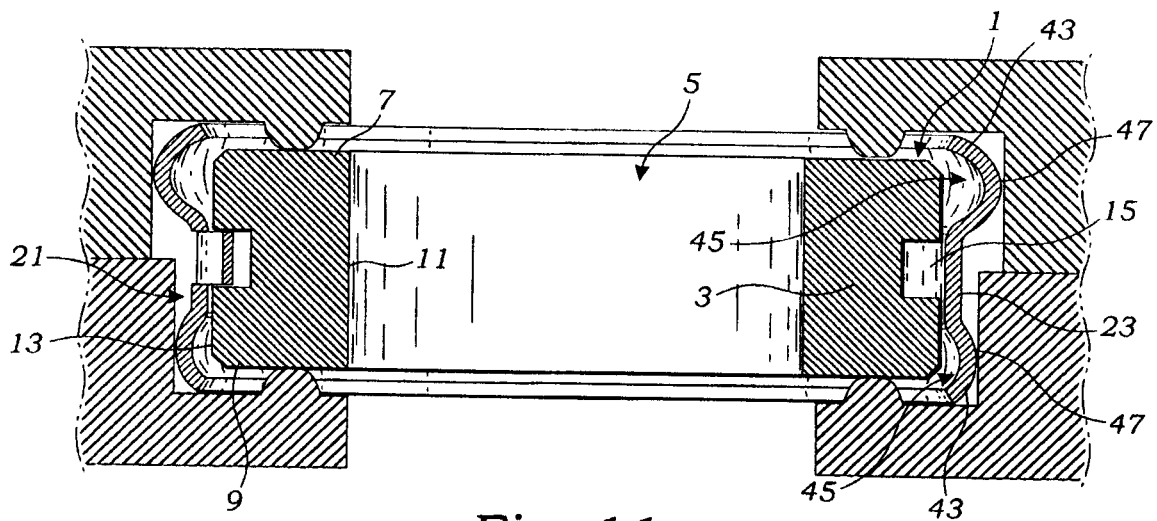

FIG. 10 is a side cross-sectional view illustrating the ring seal and retainer assembly of FIG. 9 between the opposed mating surfaces of component blocks; and FIG. 11 is a side cross-sectional view illustrating the ring seal and retainer assembly wherein the retainer includes two arcuate flanges wherein one arcuate flange is larger than the other and the assembly is positioned between the opposed mating surfaces of component blocks.

DETAILED DESCRIPTION OF THE INVENTION

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

As shown in FIGS. 6-11, the ring seal and retainer assembly of the present invention includes a ring seal 1 and a retainer 21. Though the ring seal may be constructed in various configurations as can be determined by those skilled in the art, a preferred ring seal 1 includes an annular body element 3 forming an axially aligned hole 5 for liquid or gaseous passage. Moreover, due to the annular construction of the ring seal 1, the ring seal includes a radial inner surface 11, a radial outer surface 13, a first axial end surface 7 and a second axial end surface 9. Each of these surfaces may take any number of configurations, including planar or curved constructions. For example, the radial outer surface 13 may be constructed with a curved recess forming a "C" shape, in similar construction as a typical "C seal". Additional suitable constructions for the ring seal include typical "V seals" and "Z seals". As shown in the figures, in a preferred construction, the ring seal's radial outer surface includes a groove 15. The groove may include substantially squared planar surfaces, or the groove may include curved surfaces or other constructions as can be determined by those skilled in the art.

Meanwhile, the first and second axial end surfaces, 7 and 9 respectively, are provided for forming a seal between opposed substantially parallel mating surfaces 17 (see FIGS. 8, 10 & 11) for forming a fluid or gaseous tight seal between the opposed mating surfaces of a component block. As shown in the figures, the ring seal's axial end surfaces 7 and 9 may be substantially planar. Alternatively, the seal of the ring seals 1 may include a recessed sealing surface or may include one or more concentric circular projections (not shown) rising from the surface of the axial end surfaces. The circular projections are typically only a few thousandths of an inch high and undergo significant plastic deformation when the ring seal is compressed to provide a gas or liquid tight seal.

Figure 1:
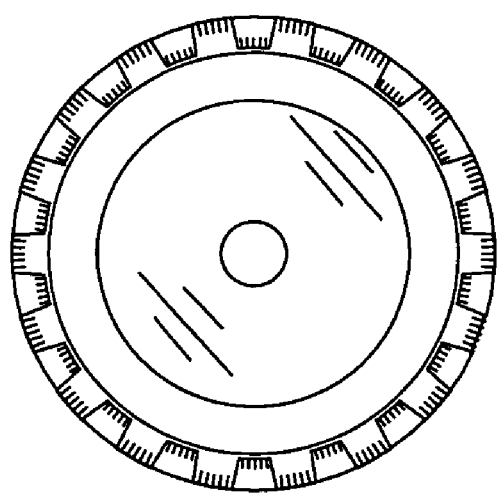
FIG. 1 is a perspective view illustrating a ring seal of the prior art.
Figure 2:
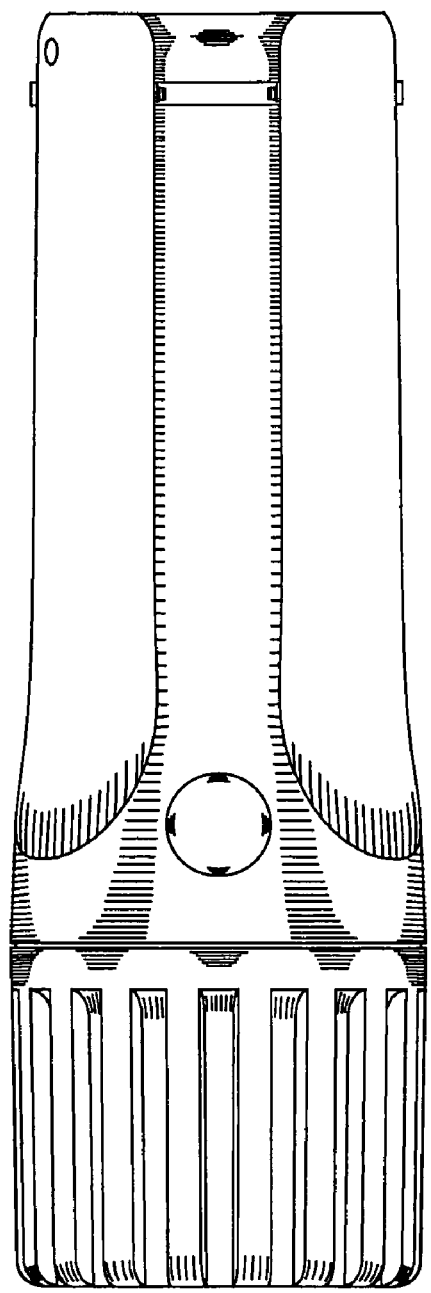
FIG. 2 is a perspective view illustrating a retainer of the prior art.
Figure 3:
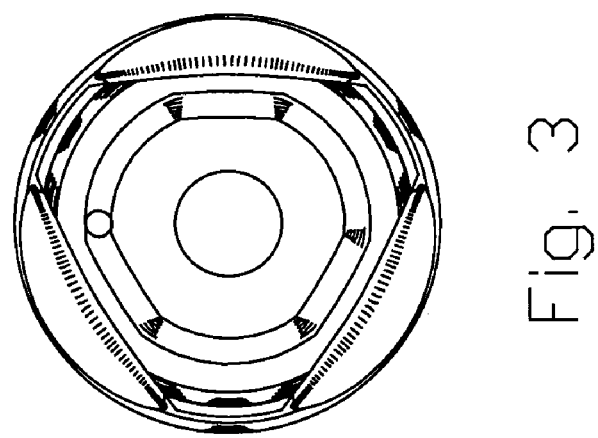
FIG. 3 is a perspective view illustrating a ring seal and retainer assembly of the prior art.
Figure 4:
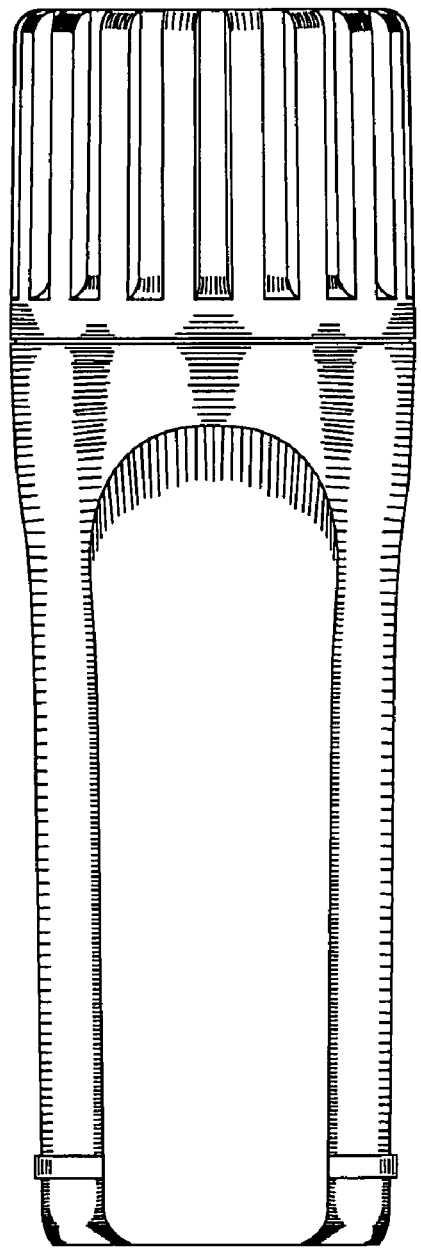
FIG. 4 is a cross-sectional view of the prior art retainer of FIG. 2.
Figure 5:
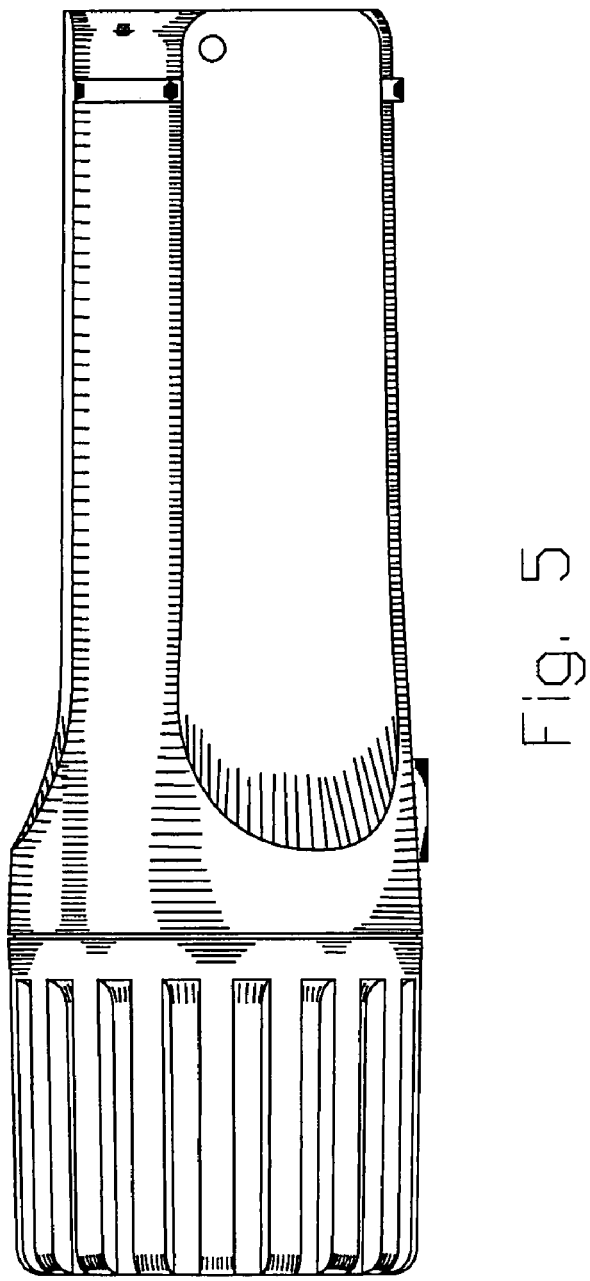
FIG. 5 is a perspective view illustrating a ring seal for use with the ring seal and retainer assembly of the present invention.

The retainer for use with the ring seal and retainer assembly of the present invention includes a circular sidewall 23 sized and positioned to substantially engage and preferably cover the ring seal's radial outer surface 13. In particular, the circular sidewall 23 extends axially so as to cover the ring seal's radial outer surface 13 so as to inhibit the ring seal's sharp metal edge from scratching or otherwise marring the sealing surfaces during assembly between two opposed sealing surfaces. Preferably, however, as shown in FIGS. 5-11, the retainer's circular sidewall has an axial length sufficient to project beyond the ring seal's axial surfaces. Projecting the circular sidewall beyond the ring seal's axial end surfaces provides protection to the ring seal during storage and inhibits the ring seal from becoming scratched or damaged when placed upon a flat surface where dirt or metal shavings could scratch the axial end surfaces of the ring seal. Accordingly, a retainer having a circular sidewall that projects axially beyond the axial end surfaces eliminates the need for the ring seal having costly recessed sealing surfaces (see FIGS. 1 and 4).

Figure 6:
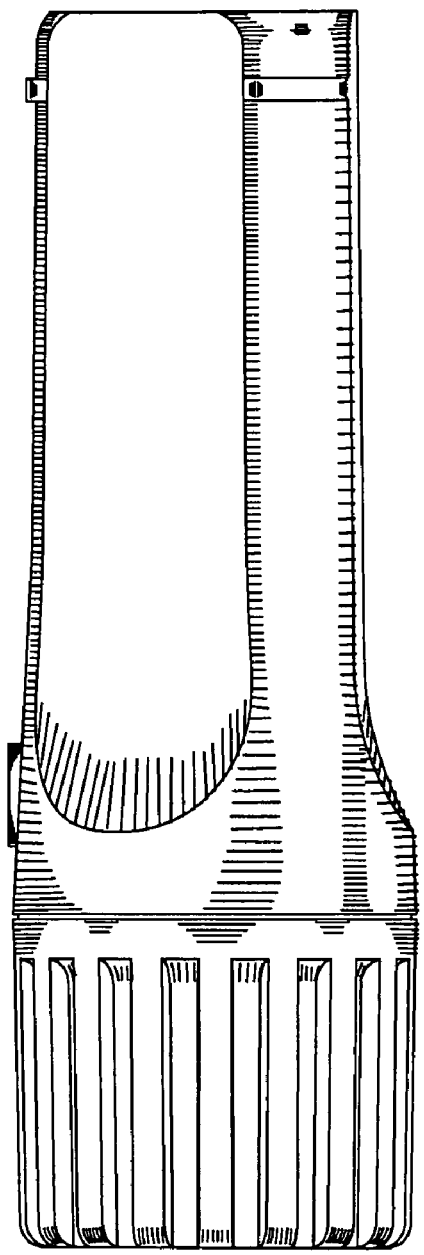
FIG. 6 is a perspective view illustrating a retainer for use with the ring seal and retainer assembly of the present invention.
Figure 8:
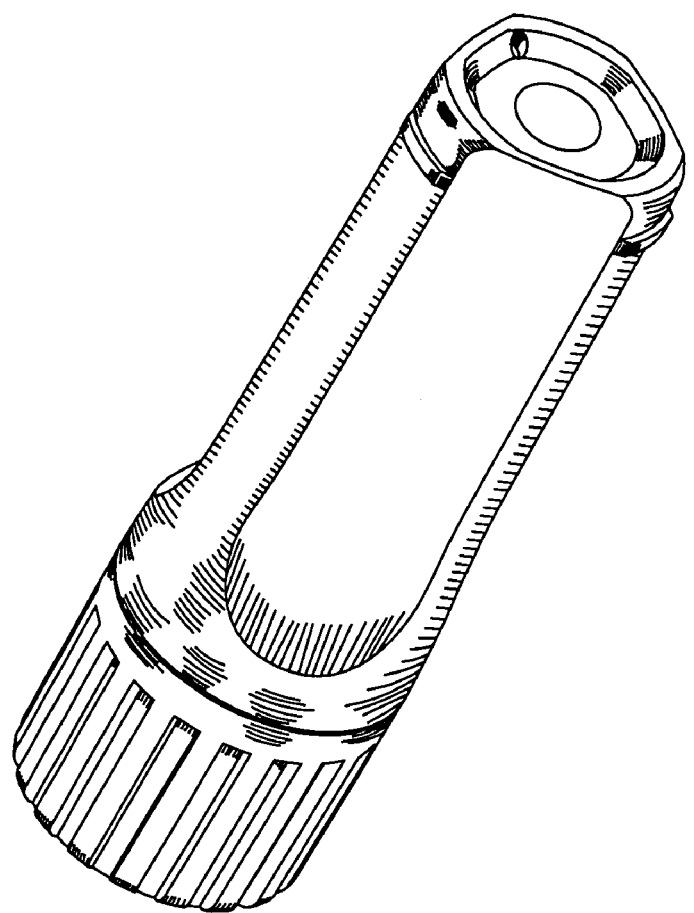
FIG. 8 is a side cross-sectional view illustrating the ring seal and retainer assembly of FIG. 7 between the opposed mating surfaces of component blocks.

The retainer's circular sidewall 23 may be affixed to the ring seal 1 by several constructions. With reference to FIGS. 6 and 8, in a first embodiment, the annular ring seal 1 includes a circumferential groove 15, while the retainer 21 includes one or more ridges 25 which are concentrically formed to project inwardly from the retainer's circular sidewall 23. In an embodiment not shown in the figures, a single ridge is sized and positioned to circumnavigate the inner surface of the retainer's circular sidewall so as to project into the ring seal when the ring seal and retainer are assembled together. Once assembled, the retainer's circular sidewall restricts tangential motion of the retainer relative to the ring seal while the retainer's inwardly projecting ridge inhibits axial movement of the retainer relative to the ring seal thereby affixing the retainer to the ring seal.

With reference to FIGS. 5-11, in an additional preferred embodiment of the invention, instead of the retainer 21 including an inwardly projecting ridge 25 which circumnavigates the retainer's circular sidewall 23, the retainer includes one or more ridge "segments" 25 which only partially circumnavigate the interior surface of the circular sidewall 23. Three ridges 25 may be provided for affixing the retainer 21 to the ring seal 1. Alternatively, as illustrated in FIGS. 5-11, four or more ridges, such as in the form of tabs, may be provided for affixing the retainer to the ring seal. However, any number of ridges 25 may be provided without departing from the spirit and scope of the invention. Again, the ridge segments are sized and positioned to project into the groove formed into the ring seal's radial outer surface to inhibit axial movement of the retainer relative to the ring seal. With reference to the figures, for manufacturing simplicity and cost, it is preferred that the internally projecting ridges be constructed in the form of tabs where the retainer is made of metal. By employing tabs, the retainer can be roll-formed from sheet metal, and the tabs can be machine punched as can be determined by one skilled in the art.

With reference to FIGS. 5-8, the retainer preferably includes an arcuate flange which extends at one of the retainer's axial extremities to form a concave interior and a convex exterior. The retainer seal may be constructed of various materials including metals, ceramics or plastics. A preferred material for the retainer is 300 series stainless steel having a Rockwell hardness of 40-44 RC. With reference to the assemblies shown in FIGS. 8, 10 and 11, manufacturing the retainer of stainless steel ensures that the arcuate flange is sufficiently stiff, but still deformable under compression when positioned within the counterbore of a component block. Advantageously, the flange extends outwardly from the ring seal to engage the interior sidewalls of the counterbore to provide for self-centering of the retainer and ring seal, as well as affix the retainer and ring seal in place while the adjacent blocks are moved together.

Figure 7:
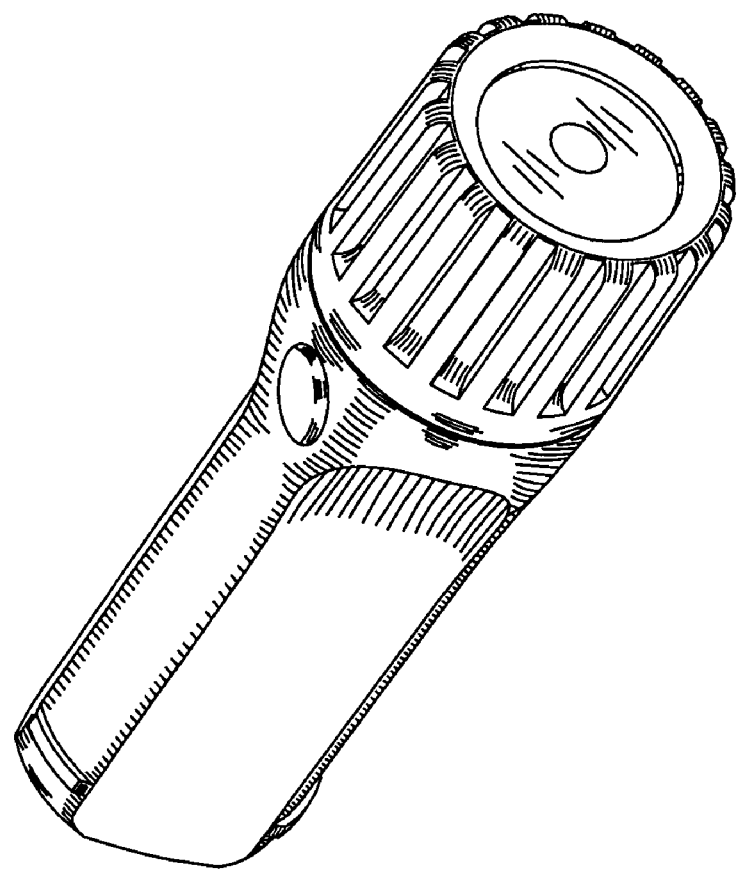
FIG. 7 is a perspective view illustrating a ring seal and retainer assembly of the present invention wherein the retainer includes a single arcuate flange.

With reference to FIGS. 9-11, the retainer of the present invention may include arcuate flanges at both its axial ends as opposed to including a single arcuate flange as illustrated in FIGS. 6-8. In addition, in the event the retainer includes arcuate flanges at both axial ends, the arcuate flanges may have different configurations. For example, as shown in FIG. 11 where the counterbores of mating blocks are of different diameters, it is preferred that the retainer 21 include two arcuate flanges 43 having correspondingly different diameters.

With reference to FIG. 8, the ring seal's groove 15 may be axially offset from the ring seal's axial center. This construction is considered desirable in the event that the retainer includes a single arcuate flange in order to provide the retainer with ridges 25 which project from the circular sidewall of the retainer into the ring seal's groove 15.

The ring seal 1 and retainer 21 of the present invention may be manufactured by various techniques known to those skilled in the art. Furthermore, as best shown in FIGS. 6, 7 and 9, the retainer may be constructed from a one piece strip of metal formed into a circular construction including a slit. The slit provides for expansion of the retainer 21 when being joined to the inner ring seal 1. In addition, the slit assists in the retainer's ability to compress within the counterbore when the retainer is being joined to a component block.

Moreover, the ring seal and retainer may be constructed of various materials known to those skilled in the art. It is preferred that the ring seal 1 be manufactured of a metal such as aluminum, copper, silver, nickel, steel or stainless steel. Meanwhile, preferably the retainer is made of various plastics such as polypropylene. Alternatively, the retainer may be made of various metals including 300 series stainless steel. However, the ring seal and retainer may be manufactured of other materials without departing from the spirit and scope of the invention.

Having described the invention in such terms to enable those skilled in the art to make and use it and having identified the presently understood best mode of practicing it, I claim:

1. A fluid coupling assembly having a ring seal and retainer assembly making a sealed joint between first and second axially mating opposed surfaces having fluid passageways, wherein said ring seal is adapted to be compressed and decompressed in the axial direction, the fluid coupling assembly comprising:

first and second opposed blocks, said first block having a first counterbore defining an inner diameter and a recessed first mating surface, and said first block having a first passageway axially aligned with said counterbore, said second block having a second mating surface opposed to said first matting surface and said second block having a second passageway opposed to said first passageway;

an annularly shaped ring seal having an axially aligned hole and substantially uncovered first and second axial end surfaces, said ring seal positioned between said first and second blocks so that said first and second axial end surfaces engage and form a seal with said first and second blocks' axially opposed first and second mating surfaces to allow for gas or fluid passage through said first passageway, through said ring seal hole and through said second passageway;

a retainer having a circular sidewall substantially circumnavigating said ring seal, said retainer including a first arcuate flange extending at least partially around said retainer and extending radially outward substantially adjacent to one of said ring seal's axial end surfaces so as to provide said ring seal and retainer assembly with a substantially increased radius substantially adjacent to one of said ring seal's axial end surfaces, said first arcuate flange having a concave inner side and a convex outer side positioned within said first counterbore to engage said first counterbore's inner diameter.

2. The fluid coupling assembly having a ring seal and retainer assembly of claim 1 wherein said retainer does not include an arcuate flange at the other of said ring seal's axial end surfaces so as to provide said ring seal and retainer assembly with a substantially increased radius substantially adjacent to one of said ring seal's axial end surfaces but not a substantially increased radius adjacent to the other of said ring seal's axial end surfaces.

3. The fluid coupling assembly having a ring seal and retainer assembly of claim 2 wherein said circular sidewall projects axially beyond the edges of said ring seal's axial end surfaces.

4. The fluid coupling assembly having a ring seal and retainer assembly of claim 1 wherein said circular sidewall projects axially beyond the edges of said ring seal's axial end surfaces.

5. The fluid coupling assembly having a ring seal and retainer assembly of claim 1 wherein said ring seal includes a circumferential grove circumnavigating said ring seal's radial outer surface which is not equidistant from said ring seal's axial end surfaces so that said groove is offset from the axial middle of said ring seal, and said retainer includes one or more ridges sized and positioned to project inward from said circular sidewall into said groove.

6. A fluid coupling assembly having a ring seal and retainer assembly making a sealed joint between first and second axially mating opposed surfaces having fluid passageways, wherein said ring seal is adapted to be compressed and decompressed in the axial direction, the fluid coupling assembly comprising:

first and second opposed blocks, said first block having a first counterbore defining an inner diameter and a recessed first mating surface, and said first block having a first passageway axially aligned with said counterbore, said second block having a second mating surface opposed to said first matting surface and said second block having a second passageway opposed to said first passageway;

an annularly shaped ring seal having an axially aligned hole and substantially uncovered first and second axial end surfaces, said ring seal positioned between said first and second blocks so that said first and second axial end surfaces engage and form a seal with said first and second blocks' axially opposed first and second mating surfaces to allow for gas or fluid passage through said first passageway, through said ring seal hole and through said second passageway; and a retainer having a circular sidewall substantially circumnavigating said ring seal, said retainer including a first arcuate flange extending at least partially around said retainer and extending radially outward substantially adjacent to one of said ring seal's axial end surfaces but said retainer not including an arcuate flange at the other of said ring seal's axial end surfaces so as to provide said ring seal and retainer assembly with a substantially increased radius substantially adjacent to one of said ring seal's axial end surfaces but not a substantially increased radius adjacent to the other of said ring seal's axial end surfaces, said first arcuate flange having a concave inner side and a convex outer side positioned within said first counterbore to engage said first counterbore's inner diameter.

7. The fluid coupling assembly having a ring seal and retainer assembly of claim 6 wherein said circular sidewall projects axially beyond the edges of said ring seal's axial end surfaces.

8. The fluid coupling assembly having a ring seal and retainer assembly of claim 6 wherein said ring seal includes a circumferential groove circumnavigating said ring seal's radial outer surface which is not equidistant from said ring seal's axial end surfaces so that said groove is offset from the axial middle of said ring seal, and said retainer includes one or more ridges sized and positioned to project inward from said circular sidewall into said groove.

9. A fluid coupling assembly having a ring seal and retainer assembly making a sealed joint between first and second axially mating opposed surfaces having fluid passageways, wherein said ring seal is adapted to be compressed and decompressed in the axial direction, the fluid coupling assembly comprising:

first and second opposed blocks, said first block having a first counterbore defining an inner diameter and a recessed first mating surface, and said first block having a first passageway axially aligned with said counterbore, said second block having a second mating surface opposed to said first matting surface and said second block having a second passageway opposed to said first passageway;

an annularly shaped ring seal having an axially aligned hole and substantially uncovered first and second axial end surfaces, said radial outer surface including a circumferential groove circumnavigating said radial outer surface, said ring seal positioned between said first and second blocks so that said first and second axial end surfaces engage and form a seal with said first and second blocks' axially opposed first and second mating surfaces to allow for gas or fluid passage through said first passageway, through said ring seal hole and through said second passageway; and an annular retainer having a circular sidewall and one or more ridges sized and positioned to project from said circular sidewall into said groove, said retainer including a first arcuate flange extending at least partially around said retainer and extending radially outward substantially adjacent to one of said ring seal's axial end surfaces so as to provide said ring seal and retainer assembly with a substantially increased radius substantially adjacent to one of said ring seal's axial end surfaces, said first arcuate flange having a concave inner side and a convex outer side positioned within said first counterbore to engage said first counterbore's inner diameter.

10. The fluid coupling assembly having a ring seal and retainer assembly of claim 9 wherein said retainer includes an arcuate flange substantially adjacent to one of said ring seal's axial end surfaces but does not include an arcuate flange at the other of said ring seal's axial end surfaces so as to provide said ring seal and retainer assembly with a substantially increased radius substantially adjacent to one of said ring seal's axial end surfaces but not a substantially increased radius adjacent to the other of said ring seal's axial end surfaces.

11. The fluid coupling assembly having a ring seal and retainer assembly of claim 10 wherein said circular sidewall projects axially beyond the edges of said ring seal's axial end surfaces.

12. The fluid coupling assembly having a ring seal and retainer assembly of claim 9 wherein said circular sidewall projects axially beyond the edges of said ring seal's axial end surfaces.

13. The fluid coupling assembly having a ring seal and retainer assembly of claim 9 wherein said ring seal's circumferential groove is not equidistant from said ring seal's axial end surfaces so as to be offset from the axial middle of said ring seal.

* * * * *

UNITED STATES PATENT AND TRADEMARK OFFICE
CERTIFICATE OF CORRECTION

| | | |
|---|---|---|
| PATENT NO. | : 7,905,497 B2 | |
| APPLICATION NO. | : 12/069744 | |
| DATED | : March 15, 2011 | |
| INVENTOR(S) | : Doyle | |

It is certified that error appears in the above-identified patent and that said Letters Patent is hereby corrected as shown below:

The title page showing an illustrative figure should be deleted and substitute therefor the attached title page Delete drawing sheets 1 - 10 and insert drawing sheets 1 - 5 consisting of figures 1 - 11 as attached Signed and Sealed this
Twenty-third Day of August, 2011

David J. Kappos
*Director of the United States Patent and Trademark Office*

(12) United States Patent
Doyle

(10) Patent No.: US 7,905,497 B2
(45) Date of Patent: Mar. 15, 2011

(54) RING SEAL AND RETAINER ASSEMBLY

(76) Inventor: Michael Doyle, Villa Park, CA (US)

(*) Notice: Subject to any disclaimer, the term of this patent is extended or adjusted under 35 U.S.C. 154(b) by 353 days.

(21) Appl. No.: 12/069,744

(22) Filed: Feb. 11, 2008

(65) Prior Publication Data
US 2008/0191426 A1 Aug. 14, 2008

Related U.S. Application Data

(60) Provisional application No. 60/902,036, filed on Feb. 12, 2007.

(51) Int. Cl.
*F16J 15/08* (2006.01)

(52) U.S. Cl. ......... 277/608; 277/616; 277/637; 277/640

(58) Field of Classification Search ............ 277/603, 277/606, 607, 608, 609, 616, 620, 624, 637, 277/639, 640, 644
See application file for complete search history.

(56) References Cited

U.S. PATENT DOCUMENTS

| | | | | |
|---|---|---|---|---|
| 3,869,132 A * | 3/1975 | Taylor et al. | | 277/608 |
| 4,552,389 A | 11/1985 | Babuder et al. | | 285/379 |
| 4,650,227 A | 3/1987 | Babuder et al. | | 285/379 |
| 4,838,583 A | 6/1989 | Babuder et al. | | 285/354 |
| 5,340,170 A | 8/1994 | Shinohara et al. | | 285/379 |
| 5,354,072 A | 10/1994 | Nicholson | | 277/206 |
| 5,423,580 A | 6/1995 | Mohlenkamp et al. | | 285/379 |
| 5,758,910 A * | 6/1998 | Barber et al. | | 285/330 |
| 5,979,910 A * | 11/1999 | Shinohara et al. | | 277/616 |
| 6,170,890 B1 * | 1/2001 | Ohmi et al. | | 285/379 |
| 6,708,985 B1 * | 3/2004 | Doyle | | 277/616 |
| 7,140,647 B2 * | 11/2006 | Ohmi et al. | | 285/328 |

* cited by examiner

*Primary Examiner* — Shane Bomar
*Assistant Examiner* — Robert F Fuller
(74) *Attorney, Agent, or Firm* — David G. Duckworth; Russo & Duckworth, LLP

(57) ABSTRACT

The ring seal and retainer assembly includes an annularly shaped ring seal defining a radial inner surface, a radial outer surface, first and second axial end surfaces and a central bore for fluid or gas passage. A retainer is provided for affixing and positioning a ring seal in a sealing assembly. The retainer includes a circular sidewall sized and positioned to engage and cover the ring seal's radial outer surface. The retainer includes an arcuate flange which extends at one of the retainer's axial extremities to form a concave interior and a convex exterior. Preferably, the arcuate flange extends outwardly to increase the retainer's radius and the arcuate flange is sized to compressibly engage the interior sidewall of the component block's counterbore.

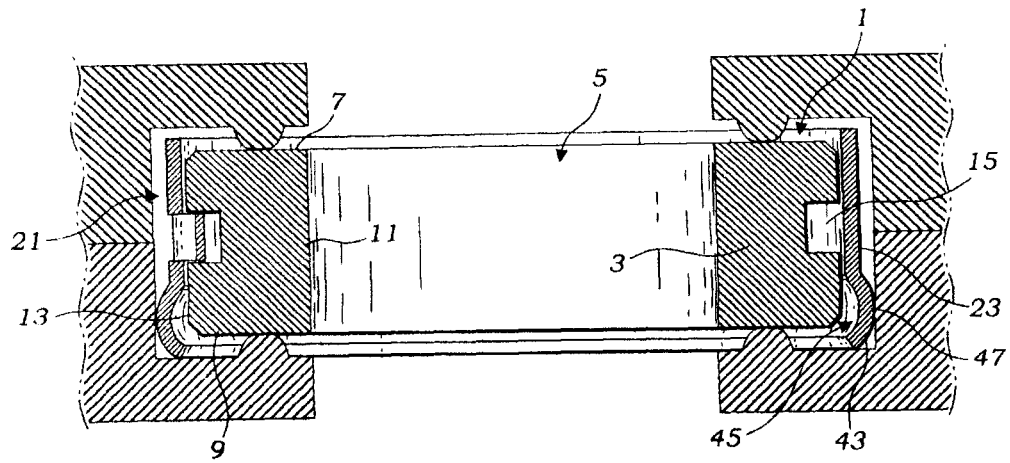

13 Claims, 5 Drawing Sheets